(12) United States Patent
Ladewski et al.

(10) Patent No.: US 11,618,242 B2
(45) Date of Patent: Apr. 4, 2023

(54) AUTOMOTIVE GLASS DISPLAY

(71) Applicant: Ford Global Technologies, LLC, Dearborn, MI (US)

(72) Inventors: Theodore Ladewski, Dearborn, MI (US); Larry Agius, Dearborn, MI (US); David C Allen, Bonita Springs, FL (US); Mary Beth Angotti, Canton, MI (US); Thomas F. Boettger, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 444 days.

(21) Appl. No.: 16/734,992

(22) Filed: Jan. 6, 2020

(65) Prior Publication Data
US 2020/0223191 A1 Jul. 16, 2020

Related U.S. Application Data

(60) Provisional application No. 62/791,946, filed on Jan. 14, 2019.

(51) Int. Cl.
*B32B 17/10* (2006.01)
*G09F 19/18* (2006.01)
(Continued)

(52) U.S. Cl.
CPC .. *B32B 17/10761* (2013.01); *B32B 17/10036* (2013.01); *G03B 21/145* (2013.01); *G03B 21/208* (2013.01); *G03B 21/56* (2013.01); *G03B 21/562* (2013.01); *G03B 21/62* (2013.01); *G09F 19/18* (2013.01); *G09F 21/04* (2013.01); *B32B 2250/40* (2013.01); *B32B 2307/412* (2013.01); *B32B 2315/08* (2013.01);
(Continued)

(58) Field of Classification Search
CPC ...... G03B 21/56; G03B 21/562; G03B 21/54; G03B 21/00; G03B 21/208; B32B 2250/40
USPC .......................................................... 353/13
See application file for complete search history.

(56) References Cited

U.S. PATENT DOCUMENTS 9,921,463 B2 3/2018 Tao et al.
9,946,147 B2 4/2018 Ide et al.
(Continued)

FOREIGN PATENT DOCUMENTS

DE 10026973 A1 12/2001
JP H04325334 A 11/1992
(Continued)

OTHER PUBLICATIONS

Translation of JP-H0933856-A (Year: 2022).*
(Continued)

*Primary Examiner* — Jerry L Brooks
(74) *Attorney, Agent, or Firm* — Vichit Chea; Carlson, Gaskey & Olds, P.C.

(57) ABSTRACT

This disclosure relates to an automotive glass display. An example vehicle includes a projector configured to project light, and a glass panel including a first layer of glass, a second layer of glass, a first layer of polyvinyl butyral (PVB), and a second layer of material. The first layer of PVB is configured to diffuse light from the projector, and the second layer of material is configured to reduce glare. Other example glass panel arrangements are also disclosed.

19 Claims, 5 Drawing Sheets

(51) Int. Cl.
*G09F 21/04* (2006.01)
*G03B 21/14* (2006.01)
*G03B 21/20* (2006.01)
*G03B 21/56* (2006.01)
*G03B 21/62* (2014.01)
*G03B 21/00* (2006.01)
*G03B 21/54* (2006.01)

(52) U.S. Cl.
CPC ..... *B32B 2329/06* (2013.01); *B32B 2605/006* (2013.01); *G03B 21/00* (2013.01); *G03B 21/54* (2013.01); *G09F 21/0485* (2021.05)

(56) References Cited

U.S. PATENT DOCUMENTS

| | | | |
|---|---|---|---|
| 9,952,494 | B2 | 4/2018 | Tao et al. |
| 10,025,027 | B2 | 7/2018 | Odulinski et al. |
| 10,105,933 | B2 | 10/2018 | Berard et al. |
| 2006/0066508 | A1* | 3/2006 | Walck ............... B32B 17/10761 359/630 |
| 2014/0015637 | A1* | 1/2014 | Dassanayake ..... G07C 9/00174 340/5.54 |
| 2015/0138627 | A1 | 5/2015 | Ehrensperger et al. |
| 2018/0201207 | A1* | 7/2018 | Kim ........................ B60R 1/006 |

FOREIGN PATENT DOCUMENTS

| | | | |
|---|---|---|---|
| JP | H0933856 A | * 2/1997 | ............ G02B 27/02 |
| JP | 2011033785 A | 2/2011 | |
| KR | 20100097935 A | 9/2010 | |

OTHER PUBLICATIONS

Grabb-It Labs. Grabb-It DD-OOH Advertising Platform, downloaded from https://grabb.io on Jan. 2, 2019.

Smart / Intelligent Film. Downloaded from http://www.glimmdisplay.com/projection-films-foils/smart-intelligent-flim-foil/ on Dec. 28, 2018.

SPaint Korea website. Downloaded from www.spaintkorea.com/ on Jan. 3, 2019.

* cited by examiner

AUTOMOTIVE GLASS DISPLAY

TECHNICAL FIELD

This disclosure relates to an automotive glass display.

BACKGROUND

Motor vehicles are increasingly used as advertising platforms. For example, vinyl vehicle wraps containing advertisements may be adhered to an exterior of the vehicle. Further, vehicles have been fitted with screens, such as liquid crystal display (LCD) screens, configured to display advertisements or other messages, which are visible to pedestrians and others adjacent the automobile. Vehicles are also increasingly used to display information, such as customer or public communications.

SUMMARY

A vehicle according to an exemplary aspect of the present disclosure includes, among other things, a projector configured to project light, and a glass panel including a layer of glass and a layer of darkened material applied to the layer of glass. The layer of darkened material is configured to diffuse light from the projector.

In a further non-limiting embodiment of the foregoing vehicle, the layer of glass is a layer of tempered glass.

In a further non-limiting embodiment of any of the foregoing vehicles, the darkened material is a layer of ceramic material.

In a further non-limiting embodiment of any of the foregoing vehicles, the darkened material is a rear projection film.

In a further non-limiting embodiment of any of the foregoing vehicles, the layer of glass is a first layer of glass, the glass panel includes a second layer of glass, the glass panel includes a first layer of polyvinyl butyral (PVB) configured to diffuse light from the projector, and the darkened material is provided by a second layer of material.

In a further non-limiting embodiment of the foregoing vehicle, the first layer of PVB is a layer of frosted PVB.

In a further non-limiting embodiment of any of the foregoing vehicles, the glass panel is translucent.

In a further non-limiting embodiment of any of the foregoing vehicles, the first layer of PVB and the second layer of material are between the first layer of glass and the second layer of glass.

In a further non-limiting embodiment of any of the foregoing vehicles, the first layer of PVB is arranged closer to an interior of the vehicle than the second layer of material, and the projector is arranged within the interior of the vehicle.

In a further non-limiting embodiment of any of the foregoing vehicles, the second layer of material is a layer of darkened PVB.

In a further non-limiting embodiment of any of the foregoing vehicles, the second layer of material is a material with adaptable light transmission properties.

In a further non-limiting embodiment of any of the foregoing vehicles, the second layer of material is layer of photochromic material.

In a further non-limiting embodiment of any of the foregoing vehicles, the second layer of material is a material with selectively adaptable light transmission properties.

In a further non-limiting embodiment of any of the foregoing vehicles, the second layer of material is a film exhibiting different light transmission properties when a voltage is applied to the film.

In a further non-limiting embodiment of any of the foregoing vehicles, the vehicle includes a voltage source electrically coupled to the film and a controller configured to issue commands to the voltage source to cause the voltage source to apply the voltage to the film.

In a further non-limiting embodiment of any of the foregoing vehicles, the vehicle includes a sensor configured to generate a signal indicative of ambient light conditions, and a controller configured to issue commands to the projector to cause the projector to change its brightness based on the ambient light conditions.

In a further non-limiting embodiment of any of the foregoing vehicles, the vehicle includes a self-driving system.

In a further non-limiting embodiment of any of the foregoing vehicles, the vehicle is one of a semi-autonomous vehicle and a fully autonomous vehicle.

A vehicle according to an exemplary aspect of the present disclosure includes, among other things, a projector configured to project light, and a glass panel including a first layer of glass, a second layer of glass darkened relative to the first layer of glass, and a layer of polyvinyl butyral (PVB) configured to diffuse light from the projector.

In a further non-limiting embodiment of any of the foregoing vehicles, the second layer of glass is tinted and the first layer of glass is clear.

BRIEF DESCRIPTION OF THE DRAWINGS

In FIG. 1, the rear side window is acting as a screen and displaying an image.

In FIG. 2, the panel of automotive glass is a laminated structure including two layers of polyvinyl butyral (PVB).

In FIG. 3, the panel of automotive glass is a laminated structure including a layer of material with selectively adaptable light transmission properties.

In FIG. 4, the panel of automotive glass includes a layer of ceramic applied to a layer of glass.

In FIG. 5, the panel of automotive glass is a laminated structure including one layer of polyvinyl butyral (PVB), and the exterior layer of glass is darkened.

DETAILED DESCRIPTION

This disclosure relates to an automotive glass display. In particular, the automotive glass is configured to diffuse light from a projector, and thus act as a screen displaying an image. Various benefits of this disclosure will be appreciated from the following description.

Figure 1:
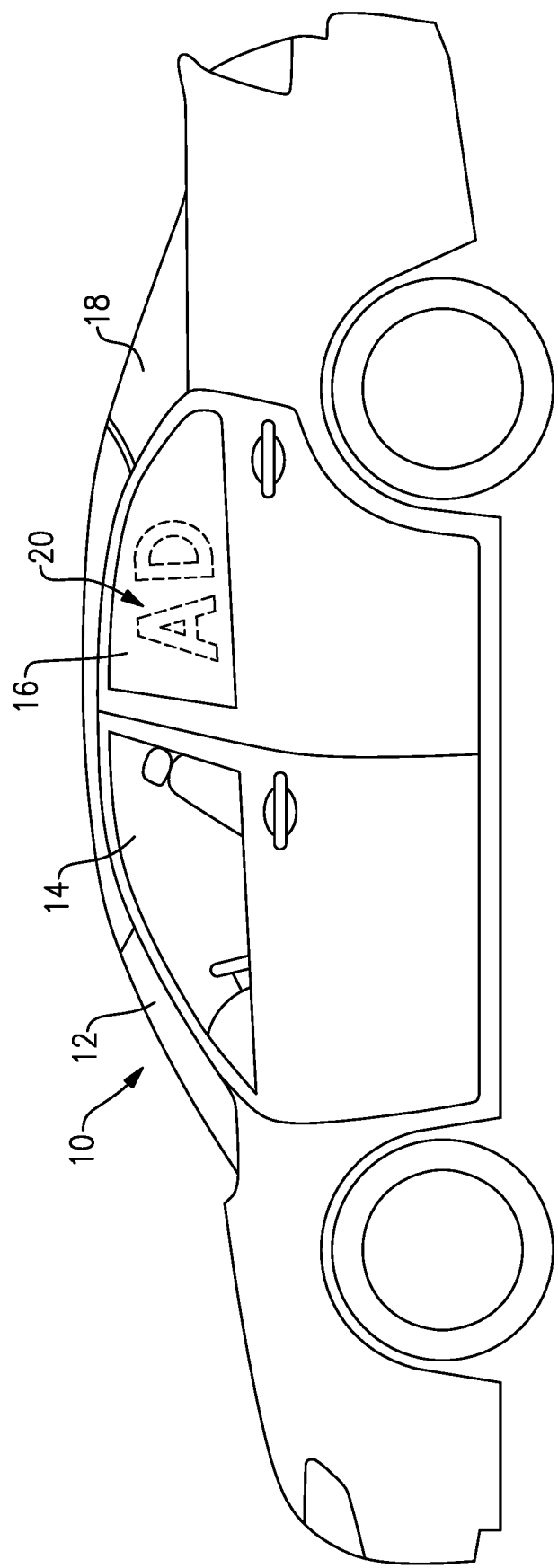
FIG. 1 is a side view of an example vehicle according to this disclosure.

Referring to the drawings, FIG. 1 is a view of an example motor vehicle (i.e., vehicle) 10 according to this disclosure. The vehicle 10 includes a plurality of panels of automotive glass, including a windshield (i.e., a windscreen) 12, side windows, such as the side windows 14, 16, and a rear window 18. The arrangement of automotive glass in FIG. 1 is exemplary. While only two side windows are shown, it should be understood that there may be two additional side windows on an opposite side of the vehicle 10. The vehicle 10 may also include a panel of automotive glass in another surface of the vehicle. Further, while the vehicle 10 in FIG. 1 is a sedan, it should be understood that this disclosure is not limited to any particular vehicle type, and extends to vans, trucks, sport utility vehicles (SUVs), etc. This disclosure also extends to semi-autonomous and fully autonomous vehicles, including vehicles with a self-driving system (SDS).

In the example of FIG. 1, the side window 16 displays an image 20, which could be a still image or a video. The image 20 is represented in FIG. 1 generically using dashed lines spelling "AD," which is short for advertisement. While the image 20 may be an advertisement, including a logo and/or text, the image 20 is not limited to advertisements. Rather, the image 20 could be any type of still image or video. The image 20 could include text conveying a message, alert, or command. While the image 20 is displayed on the side window 16 in FIG. 1, such images could be displayed on any or all of the panels of automotive glass of the vehicle 10. Indeed, with the advent of autonomous vehicles, it is becoming less necessary for vehicle occupants to see outside the vehicle 10. To this end, such images may even be projected on the windshield 12.

Figure 2:
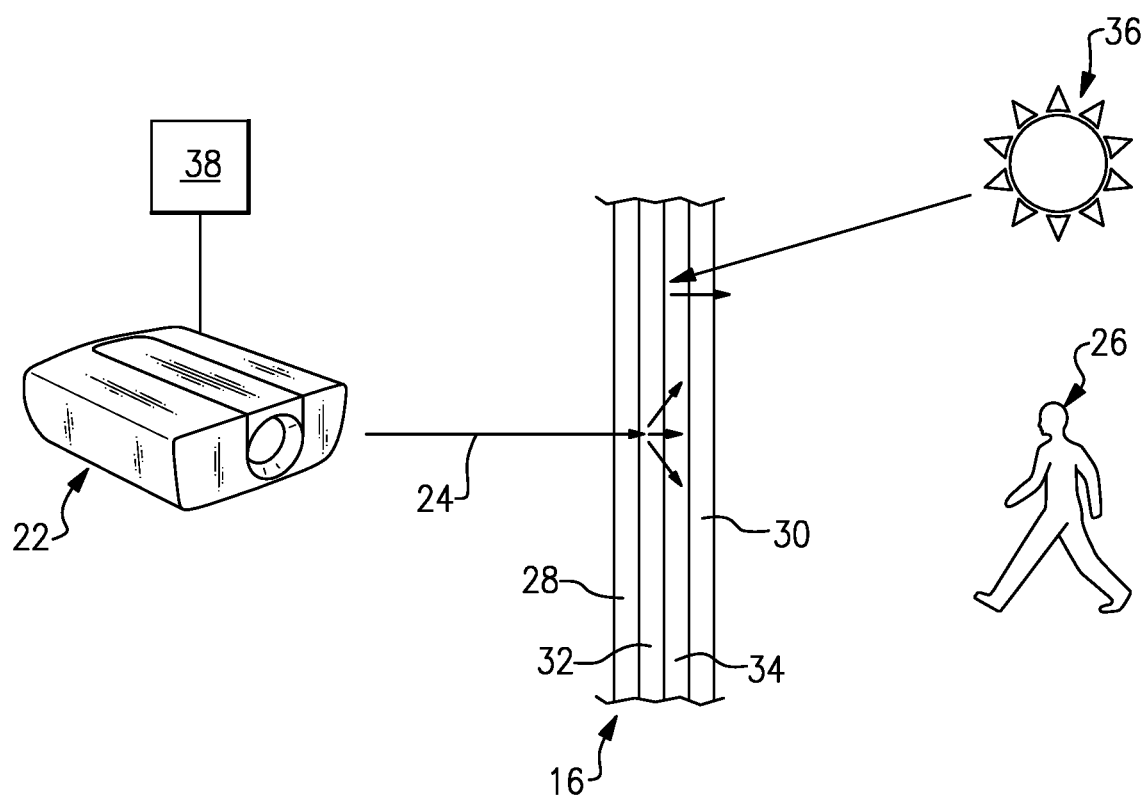
FIG. 2 is a schematic view of an example system including a projector configured to project light onto a panel of automotive glass, which acts as a screen displaying an image.

FIG. 2 schematically illustrates an example system, which includes a projector 22 configured to project the image 20 onto the side window 16. Again, while the side window 16 is shown in FIG. 2, FIG. 2 is representative of the manner in which any of the panels of automotive glass in the vehicle 10 would act as screens displaying images from the projector 22. In particular, it should be understood that the other panels of automotive glass may be arranged in the same way as the side window 16, as shown in FIG. 2.

The projector 22 is an optical device configured to project an image, including still and/or moving images (i.e., video), onto the side window 16. To this end, the projector 22 may be provided by any type of known projector, such as a 350 lumen LED projector. The projector 22, in one example, is configured to project light 24 toward the side window 16 at an angle inclined by about 20° relative to a line normal to the side window 16. The projector 22 and side window 16 are arranged such that the image 20 exhibits a contrast ratio of at least 1.35, which makes the image 20 readily visible. This disclosure extends to other projector types and orientations.

Again, the side window 16 diffuses light 24 from the projector 22 and acts as a screen configured to display the image 20. In the system of FIG. 2, the projector 22 and side window 16 are arranged as a rear projection system. In particular, the projector 22 is mounted inside the vehicle 10. The light 24 projected onto the side window 16 is visible from the exterior of the vehicle 10 by a pedestrian or other person adjacent the vehicle 10. One example person is represented at 26. The rear projection system is particularly suited to display images and other information to persons, such as the person 26, near (i.e., within about 100 feet) the vehicle 10. Again, the images may be advertisements or commands, as examples. In the example where the vehicle 10 is an autonomous vehicle, the image may include a command or alert conveyed to the person 26, such as commands that may be useful in on-demand transportation applications, including an indication that the person 26 may enter the vehicle 10 or that the person 26 should clear away from the vehicle 10.

An example arrangement of the side window 16 will now be described. In FIG. 2, the side window 16 is provided by a laminated glass structure including a first layer of glass 28 facing an interior of the cabin of the vehicle 10, and a second layer of glass 30 facing an exterior of the vehicle 10. The first and second layers of glass 28, 30 are transparent glass in this example. Two layers of polyvinyl butyral (PVB) are sandwiched between the first and second layers of glass 28, 30. A first layer of PVB 32 is arranged adjacent the first layer of glass 28, and a second layer of PVB 34 is arranged between the first layer of PVB 32 and the second layer of glass 30. The side window 16 is manufactured using a known laminating process, including bonding the layers 28, 30, 32, 34 together by applying heat and pressure thereto. The first and second layers of PVB 32, 34 keep the first and second layers of glass 28, 30 bonded even when broken.

In addition to holding the layers of glass 28, 30 together, the first and second layers of PVB 32, 34 are adapted to make the side window 16 act as a screen. In this example, the first layer of PVB 32 is provided by a layer of frosted PVB material. In particular, the first layer of PVB 32 is provided by a layer of PVB material with an added pigment, which makes the PVB material translucent. In turn, the side window 16 is not transparent, but is rather translucent, meaning the side window 16 is semitransparent. In one particular example, the frosted PVB material exhibits a white or grey color.

Transparent laminated glass, such as that commonly used in windshields, is typically held together by a layer of PVB which is translucent before laminating, but is transparent after processing. In this disclosure, the added pigment makes the first layer of PVB 32, and in turn the side window 16, translucent after a laminating process occurs. Making the first layer of PVB 32 translucent increases the quality of the image 20 over a transparent, see-through display. Example pigments include iron pigments, cobalt pigments, cadmium pigments, chromium pigments, copper mercury pigments, titanium pigments, zinc pigments, lead pigments, magnesium pigments, manganese pigments, and vanadium pigments. This disclosure is not limited to any particular type of pigment, however.

The first layer of PVB 32 diffuses the light 24 from the projector 22, as generally shown in FIG. 2. When the person 26, for example, views the side window 16 from outside the vehicle 10, the image 20 is clearly visible. One potential impediment to viewing the image 20 is glare from the sun 36, however. While glare is mentioned herein, other types of competing luminance are contemplated in this disclosure. In this disclosure, the second layer of PVB 34 is darkened, meaning it is configured to reduce the amount of light passing through the second layer of PVB 34. The second layer of PVB 34 may be darkened by tinting with a dye (i.e., colored) or in another manner. Further still, the second layer of PVB 34 may be metallized in some other manner. The second layer of PVB 34 may be darkened with a material configured to reject solar radiation. Providing darkened PVB as opposed to, for example, darkening the layer of glass 30 increases the ease of manufacturing the side window 16 because the layers of glass 28, 30 are the same color and thus respond similarly to heat during a glass bending process, for example.

In one example, the second layer of PVB 34 is configured to permit light transmission within a range of between 18% and 50%. This range of light transmission ensures that the second layer of PVB 34 is not so dark that it blocks transmission of light 24 from the projector, while still also ensuring that competing luminance (e.g., glare from the sun 36) is reduced so that the image 20 can be viewed in ambient light (e.g., direct sunlight).

The laminated glass structure shown in FIG. 2 is cost effective and relatively easily manufactured, and in particular may be manufactured with only slight variations to existing automotive glass manufacturing processes. Further, the resultant laminated glass exhibits less noise and vibration compared to other types of glass, such as tempered glass. Sandwiching two layers of PVB between glass layers serves to protect the PVB layers from being scratched, and also makes the glass relatively easy to clean. The laminated glass structure achieves good image brightness with limited bright spots, and the image is visible even at acute angles.

In one example, the entirety of the side window 16 is provided by the laminated glass structure shown in FIG. 2. In another example, only a portion of the side window 16 is provided by the laminated glass structure shown in FIG. 2, meaning that only a portion of the side window is configured to act as a screen displaying the image. In this way, one or more sections of the side window 16 may be transparent, while one or more other sections of the side window 16 are translucent. In the context of the windshield 12, one or more sections near the bottom, top, or sides of the windshield may be arranged as shown in FIG. 2, while the sections of the windshield 12 corresponding to the primary sight lines required for driving are transparent. The windshield 12 could, for example, include a continuous or segmented band or strip along the bottom of the windshield 12 arranged as the in FIG. 2. Such bands or strips could be used to display information and act as a heads-up display (HUD). In one example manufacturing process, sections of ordinary PVB are cut, using a die for example, and are replaced with correspondingly-shaped sections of the layers of PVB 32, 34. It should be understood that this disclosure extends to other manufacturing processes, however.

While the first layer of PVB 32 is translucent, in some examples the first layer of PVB 32 could be completely opaque. An opaque or translucent arrangement may be useful when the projector 22 is used to display information visible to the occupants of the vehicle 10, such as in the context of a heads-up display or when the targets of a particular advertisement are the occupants of the vehicle as opposed to pedestrians, for example. While some known heads-up displays are configured to project onto transparent glass, this disclosure contemplates translucent or opaque glass for use with heads-up displays. In this regard, the heads-up display of this disclosure may be considered a quasi-heads-up display.

The vehicle 10 further includes a controller 38 in electronic communication with a number of components, including the projector 22. The controller 38 is configured to issue commands and send information to the projector 22 to cause the projector 22 to display a particular image. It should be understood that the controller 38 may include hardware and software, and could be part of an overall vehicle control module, such as a vehicle system controller (VSC), or could alternatively be a stand-alone controller separate from the VSC. Further, the controller 38 may be programmed with executable instructions for interfacing with and operating the various components of the vehicle 10. The controller 38 additionally includes a processing unit and non-transitory memory for executing the various control strategies and modes of the vehicle system. Further, the controller 38 may be in electronic communication with one or more sensors, such as sensor 44 (discussed below), which detects ambient light. In that example, the controller 38 may issue commands to the projector 22 causing the projector 22 to change its brightness corresponding to ambient light conditions, such as dimming at night and brightening during the day.

Alternatively, the first and second layers of PVB 32, 34 may be replaced by a rear projection film applied either to the layer of glass 28 or 30. Specifically, a layer of rear projection film may be applied to the inner side of the layer of glass 28 or the outer side of the layer of glass 30.

Figure 3:
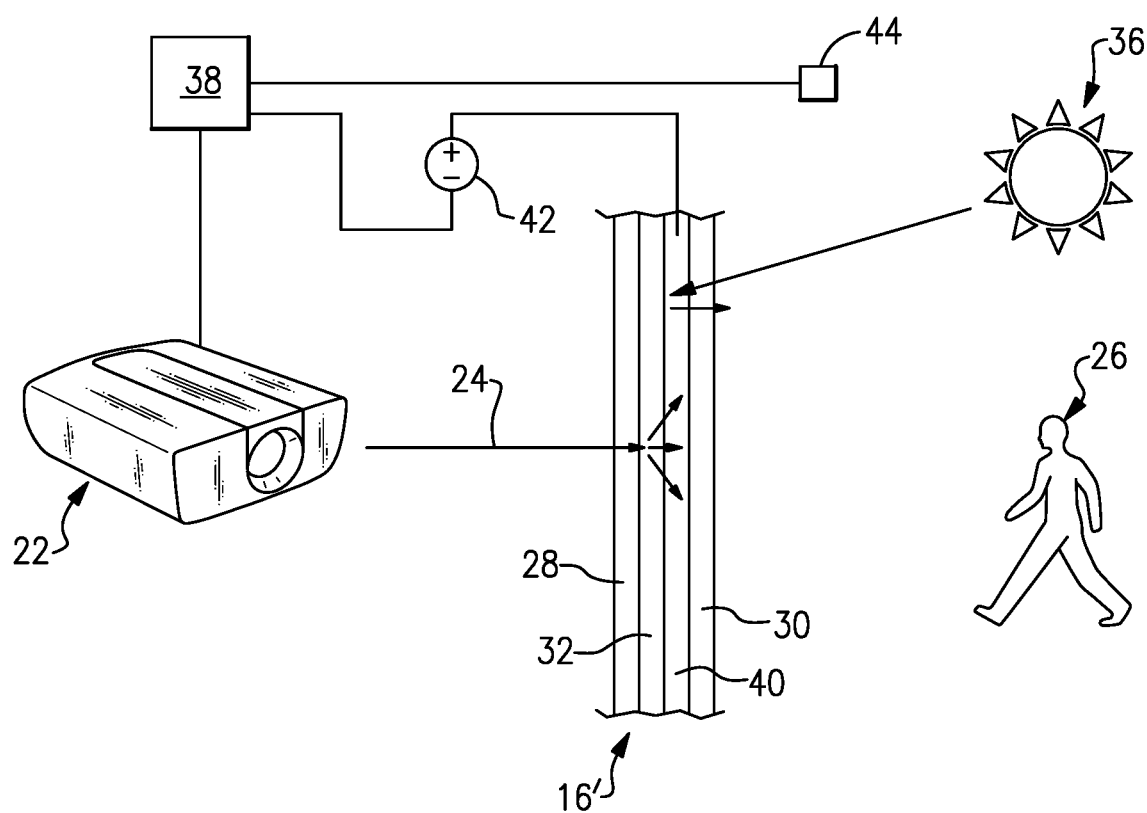
FIG. 3 is a schematic view of another example system.

FIG. 3 illustrates a system similar to that of FIG. 2, but with another example arrangement of the side window 16'. Again, while the side window 16' is shown in FIG. 3, the side window 16' is representative of any of the windows of the vehicle 10.

In FIG. 3, the side window 16' is arranged in nearly the same manner as the side window 16, but the side window 16' includes a layer of material with selectively adaptable light transmission properties. In particular, in place of the second layer of PVB 34, the side window 16' includes a layer of film 40, which exhibits different light transmission properties when a voltage is applied to the film 40. The film 40 may be provided by a suspended-particle device (SPD), or an electrochromic device, as examples.

The film 40 is in electronic communication with a voltage source 42, which is in turn in electronic communication with the controller 38. The controller 38 is configured to issue commands to the voltage source 42 to apply a voltage to the film 40. The controller 38 may further be in communication with one or more sensors, such as the sensor 44, which is configured to generate signals indicative of the ambient light conditions near the vehicle 10. The sensor 44 may be any known type of sensor configured to detect light, such as a camera, and may be mounted to an exterior of the vehicle 10.

The controller 38 issues commands to the voltage source 42 such that the transparency of the film 40 corresponds to the ambient light conditions. When low light conditions are present, such as at night or on a cloudy day, the controller 38 causes the voltage source 42 to a different voltage to the film 40 to increase the transmittance of the film 40. In one example, the voltage level is such that the film 40 is completely transparent. On the other hand, when the vehicle 10 is in a relatively bright environment, such as during daytime on a clear day, the controller 38 causes the voltage source 42 to apply no voltage, or a relatively low voltage, to the film 40 which reduces the transparency of the film 40, thereby reducing glare from the sun 36 and increasing the visibility of the image 20.

Alternatively, the film 40 may be a photochromic layer of material configured to lighten or darken when exposed to certain types of light, such as ultraviolet (UV) light. In the case of a photochromic layer of material, the voltage source 42 and sensor 44 are not present, and the controller 38 is not required to perform the functionality described above with respect to the voltage source 42 and sensor 44.

Figure 4:
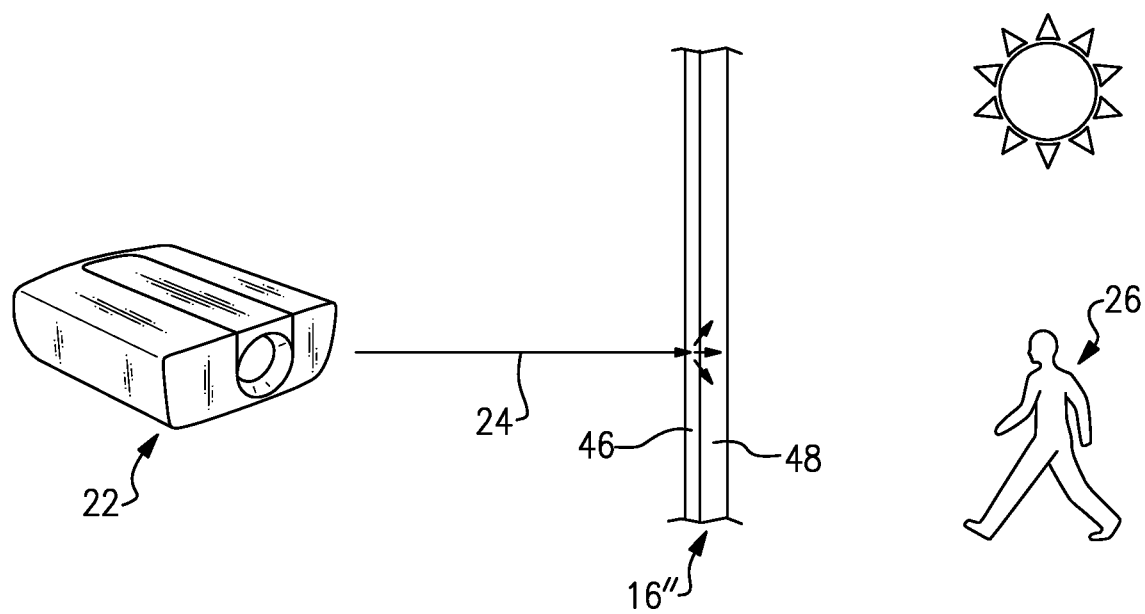
FIG. 4 is a schematic view of yet another example system.

FIG. 4 illustrates another example arrangement of the side window 16". Again, the side window 16" is representative of any window of the vehicle 10. Unlike the side windows 16, 16' discussed above, the side window 16" does not include a layer of frosted PVB, and the side window 16" is not a laminated glass structure. Rather, the side window 16" includes a layer of ceramic 46 applied to a surface of glass 48, which is tempered glass in one example. The layer of ceramic 46 is translucent and is configured to diffuse the light 24 from the projector 22, similar to the layer of PVB 32. The layer of ceramic 46 is durable, scratch resistant, easily cleaned, and does not require laminating. The layer of ceramic 46 may be cut or printed to size and applied to the surface of tempered glass 48 using known manufacturing techniques. The layer of ceramic 46 may be darkened with a pigment or die to reduce glare. Alternatively or in addition, the tempered glass 48 could be tinted.

Figure 5:
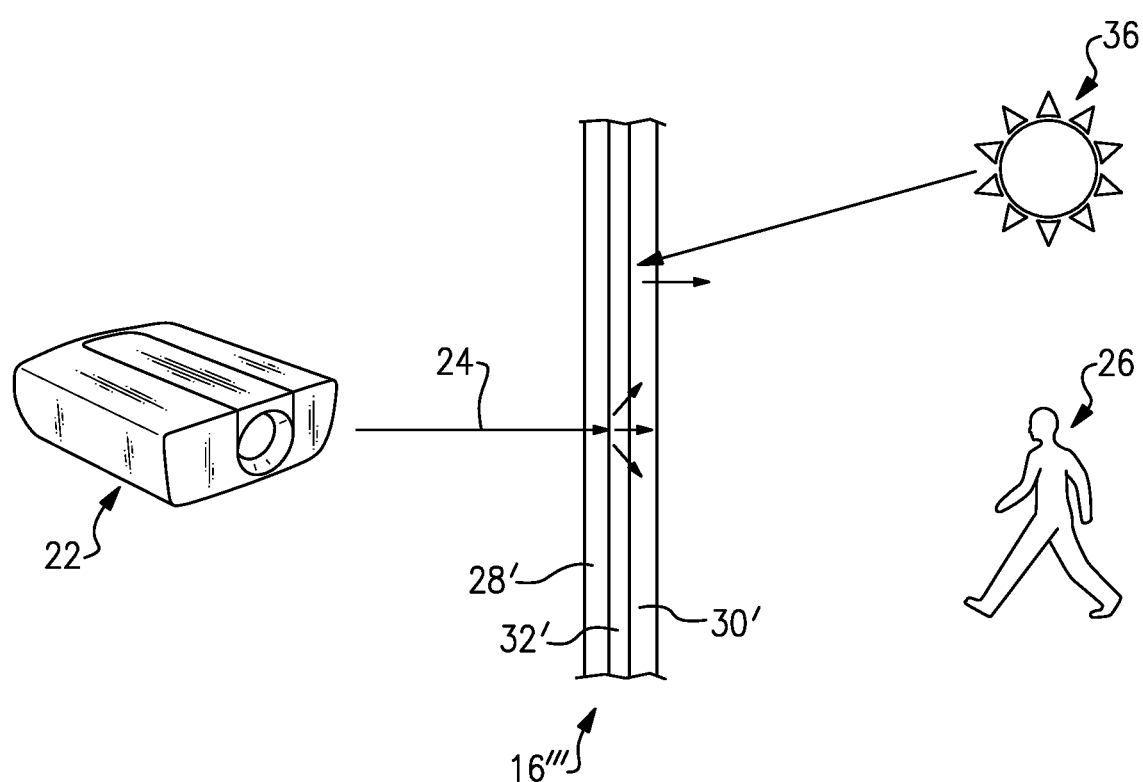
FIG. 5 is a schematic view of still another example system.

FIG. 5 illustrates another example arrangement of the side window 16'''. The side window 16''' is similar to that of FIG.

2 but with film 40 removed and with the second layer of glass 30' being darkened. In one example, first layer of glass 28' is clear (i.e., maximum possible transmittance) and the second layer of glass 30' is tinted. The layer 32' is a layer of PVB similar to the layer of PVB 32 in FIG. 2. The side window 16''' of FIG. 5 is manufactured such that the layers 28' and 30' are substantially the same shape despite being different colors. For this reason, the side window 16''' of FIG. 5 may be slightly more difficult to manufacture than the side window 16 of FIG. 2, however the side window 16''' may also provide a benefit of decreased cost due to the absence of film 40 and thus may be appropriate for certain use cases.

It should be understood that terms such as "about," "substantially," and "generally" are not intended to be boundaryless terms, and should be interpreted consistent with the way one skilled in the art would interpret those terms. It should also be understood that terms such as "front," "rear," "side," etc., are used herein relative to the normal operational attitude of the vehicle 10 for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle, comprising:
a projector; and
a glass panel including a layer of glass and a layer of darkened material applied to the layer of glass, wherein the projector is configured to project an image onto a side of the glass panel facing an interior of the vehicle, wherein the layer of darkened material is configured to diffuse light from the projector such that the same image projected onto the side of the glass panel by the projector is visible by a person viewing the glass panel from an exterior of the vehicle, wherein the projector and the glass panel are configured such that the image exhibits a contrast ratio of at least 1.35.

2. The vehicle as recited in claim 1, wherein the layer of glass is a layer of tempered glass.

3. The vehicle as recited in claim 1, wherein the darkened material is a rear projection film.

4. The vehicle as recited in claim 1, wherein:
the layer of glass is a first layer of glass,
the glass panel includes a second layer of glass,
the glass panel includes a first layer of polyvinyl butyral (PVB) configured to diffuse light from the projector, and
the darkened material is provided by a second layer of material.

5. The vehicle as recited in claim 4, wherein the first layer of PVB is a layer of frosted PVB.

6. The vehicle as recited in claim 4, wherein the glass panel is translucent.

7. The vehicle as recited in claim 4, wherein the first layer of PVB and the second layer of material are between the first layer of glass and the second layer of glass.

8. The vehicle as recited in claim 4, wherein:
the first layer of PVB is arranged closer to an interior of the vehicle than the second layer of material, and
the projector is arranged within the interior of the vehicle.

9. The vehicle as recited in claim 4, wherein the second layer of material is a layer of darkened PVB.

10. The vehicle as recited in claim 1, further comprising:
a sensor configured to generate a signal indicative of ambient light conditions; and
a controller configured to issue commands to the projector to cause the projector to change its brightness based on the ambient light conditions.

11. The vehicle as recited in claim 1, wherein the vehicle includes a self-driving system.

12. A vehicle, comprising:
a projector; and
a glass panel including a first layer of glass, a second layer of glass darkened relative to the first layer of glass, and a layer of polyvinyl butyral (PVB) configured to diffuse light from the projector, wherein the projector is configured to project a video onto the glass panel such that the same video projected onto the glass panel is visible by a person on an exterior of the vehicle, wherein projector and the glass panel are configured such that the video exhibits a contrast ratio of at least 1.35.

13. The vehicle as recited in claim 12, wherein the second layer of glass is tinted and the first layer of glass is clear.

14. The vehicle as recited in claim 1, wherein the image includes text conveying a command or alert indicating a person on the exterior of the vehicle may enter the vehicle or should clear away from the vehicle.

15. The vehicle as recited in claim 1, wherein the glass panel is a side window of the vehicle.

16. The vehicle as recited in claim 1, wherein the image or information includes text oriented such that the text is readable in a left-to-right direction, and such that letters within the text are not reversed, from a perspective of the exterior of the vehicle.

17. The vehicle as recited in claim 1, wherein the projector is a 350 lumen light emitting diode projector and is configured to project light toward the glass panel it an angle inclined by about 20° relative to a line normal to the glass panel.

18. The vehicle as recited in claim 1, wherein the image is a video.

19. The vehicle as recited in claim 1, wherein the projector is configured to project light, and wherein the image is projected onto the glass panel in the form of light emitted from the projector.

* * * * *